Aug. 8, 1950 G. F. ROGERS 2,517,715

BEAM DEFLECTION SYSTEM FOR CATHODE-RAY DEVICES

Filed Dec. 30, 1949

INVENTOR
Gordon F. Rogers
BY
George T. Craig
ATTORNEY

Patented Aug. 8, 1950

2,517,715

UNITED STATES PATENT OFFICE 2,517,715

BEAM DEFLECTION SYSTEM FOR CATHODE-RAY DEVICES

Gordon F. Rogers, New Hyde Park, N. Y., assignor to Radio Corporation of America, a corporation of Delaware Application December 30, 1949, Serial No. 135,915

2 Claims. (Cl. 315—27)

The present invention relates to means for deflecting the cathode ray beam in a cathode ray tube, and, more particularly, but not necessarily exclusively, to novel means for causing scanning deflection in cathode ray beam apparatus, such, for example, as a cathode ray tube, in which a single tube serves a dual purpose.

In accordance with the invention a single multi-element tube serves as a controlled oscillator and as an output tube for supplying deflecting current to the beam deflecting means associated with a cathode ray tube. With the circuit connections disclosed herein, the multi-element tube serves as a blocking oscillator and as an output or power tube for driving the deflecting device associated with a cathode ray tube. The deflecting device in the illustrative examples shown in the accompanying drawing and described herein is a deflecting coil or coils. In the illustrative examples the control signal for the blocking oscillator section of the multi-element tube are the usual television sync signals.

The principal aim of the present invention is to eliminate the need for one tube in cathode ray tube apparatus, such, for example, as a television receiver. This aim or object is accomplished in accordance with the invention by making one tube serve as both the blocking oscillator and the output tube for the deflection coil or coils which produce one component, the vertical component, of scanning deflection.

Another object is to provide novel apparatus including a multi-element tube for providing and controlling the deflection of the cathode ray beam in a cathode ray tube.

Other objects and advantages of the present invention will, of course, become apparent and immediately suggest themselves to those skilled in the art to which the invention is directed from a reading of the following specification in connection with the accompanying drawings in which.

Figure 1:
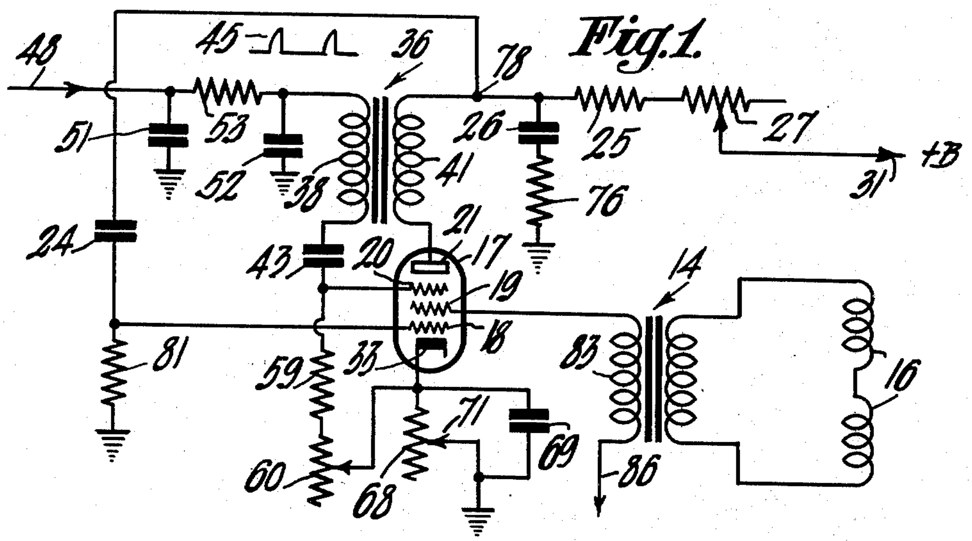
Fig. 1 shows, diagrammatically, a portion of a television receiver embodying the present invention.

Referring to Fig. 1 of the drawing, there is shown by way of example a deflection circuit for deflecting the cathode ray beam of a cathode ray tube (not shown) in one direction, for example, the vertical direction. Another similar deflection circuit (not shown) may be employed to produce deflection in another direction substantially at right angles to the first direction thereby to produce a scanned raster in a well known manner. Known deflection wave form generating circuits, generally similar to that shown herein by way of example, are disclosed in U. S. Patent No. 2,101,-

520, granted December 7, 1937 to W. A. Tolson and Tolson reissue Patent No. Re. 20,338, dated April 30, 1937.

The deflection circuit selected by way of example is a setting for the present invention, although the invention is not limited in use to circuits of this type, comprises a deflection transformer 14 and a deflection coil or coils 16. The coils 16 may be incorporated in a deflection yoke for use with a cathode ray tube (neither shown). Suitable centering means (not shown) such as are by now well known in the art, may be incorporated as desired in the circuit which supplies deflection current to the coils 16.

A multi-grid tube 17 is connected in the system, so that its No. 1 grid 18 and No. 2 grid 19 serve as the control grid and anode or plate, respectively, of what is, in effect, a separate output tube. The No. 3 grid 20 and the tube anode or plate element 21 serve for the grid and plate of a blocking oscillator. Solely by way of example, the tube 17 may be a type 6SB7-Y tube. This tube has a 4th grid tied to the No. 2 grid 19 which is not needed.

The grid 18 of the power tube section of the tube 17 is connected through suitable coupling means, shown as a condenser 24, to a resistor and condenser combination 25 and 26. The condenser 26 is connected to a suitable source of positive potential (not shown) through the resistor 25 which serves as a charging resistor. An additional adjustable resistor 27 is included in series with the resistor 25 and serves as a deflection amplitude or size control. The voltage supply source may be the usual "B+" or anode supply source generally associated with electronic equipment. The point of connection to the positive source is indicated at the terminal 31. The condenser 26 is charged through the resistors 25 and 27 and is discharged when the blocking oscillator tube section becomes conductive.

The blocking oscillator connection referred to above for the tube elements 20, 21 and the tube cathode 33 includes a transformer 36 having a primary 41 and a secondary 38. The primary 41 is connected to the anode or plate 21 of the tube 17 and the grid 20 of the tube is connected through a capacitor 43 to the end of the secondary 38.

Sync pulses 45, which, in the illustrative example are vertical sync pulses, are generated or derived in any manner which is by now well known to those skilled in the art. In the illustrative example the sync pulses are separated from the sync signal input applied at the terminal 48 by an integrating circuit comprising condenser 51 and 52 and a resistor 53.

During the charge cycles of the condenser 26 the charging curve is substantially linear, initially. The blocking oscillator section of the tube 17 is blocked by a charge on the condenser 43 which holds the grid 20 negative. This charge on the condenser 43 leaks off at a controlled rate through a resistor 59 and an adjustable resistor 60 until the conduction point of the blocking oscillator portion of the tube 17 is reached. The resistor 60 thereby serves as a speed control for deflection. When the conduction point is reached the grid voltage is raised immediately and increases due to transformer action. During this part of the cycle grid current is drawn and condenser 43 is charged. Following this, the grid is driven abruptly negative.

The circuit for the tube cathode 33 includes a cathode resistor 68 shunted by a capacitor 69. The adjustable contact arm 71 is returned to a reference point in the circuit such as ground. The resistor 68 serves as a linearity control.

The sawtooth of voltage, which may be modified in waveform, if desired, by a peaking resistor 76, appears at the point 78 during operation of the blocking oscillator section of the tube 17 and is applied as stated above, by way of the condenser 24 to the grid 18 of the tube. A grid resistor 81 is provided for the grid 18. The grid 19 which serves as the anode or plate of the power tube section of the tube 17 is connected to the primary 83 of the transformer 14. The primary 83 is also connected to the tube source (not shown) of positive potential as indicated schematically at 86.

Figure 2:
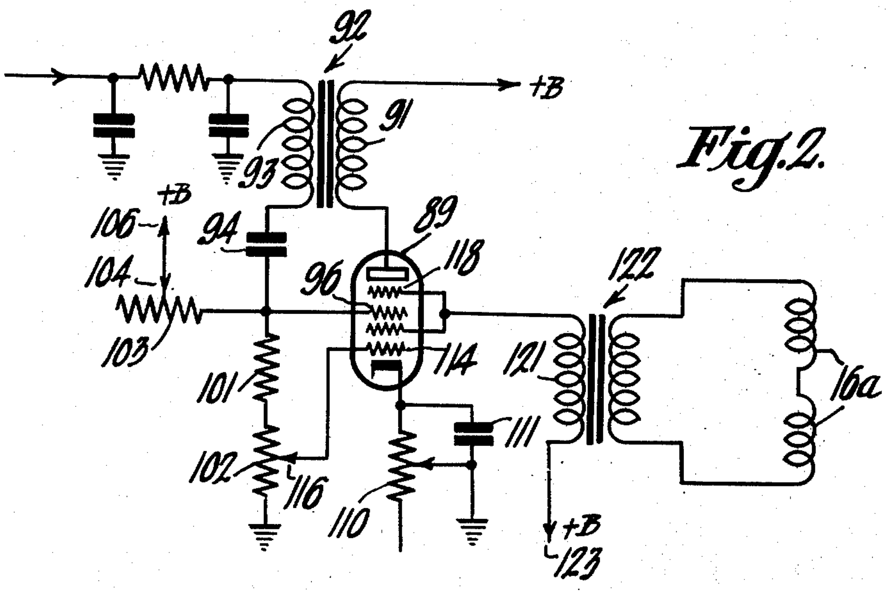
Fig. 2 is a schematic showing of the circuits of a portion of a television receiver embodying the invention in a modified form.

Fig. 2 of the drawing shows another embodiment of the invention in which the wave form of the grid of the blocking oscillator section serves to drive the power tube section of the single tube 89 which is employed in accordance with this aspect of the invention as a blocking oscillator tube and as an output tube. Referring to Fig. 2, it will be seen that the blocking oscillator section is similar to that shown by Fig. 1. In Fig. 2 the primary 91 of the transformer 92 is connected directly to the source of positive potential (not shown) inasmuch as a condenser for generating a sawtooth wave is not required. The secondary 93 of the transformer 92 is connected through a condenser 94 to the grid 96 of the tube 89. Sync signals are applied to the secondary 93 of the transformer 92 in the manner shown in Fig. 1. The grid 96 is returned to a point of suitable potential through a voltage divider comprising a resistor 101, a potentiometer 102, and a variable resistor 103. The movable contact 104 of the resistor 103 is connected to the previously mentioned source of positive potential, as indicated schematically at 106. The cathode 109 of the tube 89 is returned to a voltage reference point such, for example, as ground by way of an adjustable resistor 110. A condenser 111 shunts the resistor 110. In this embodiment the average voltage applied to grid 114 is negative. Therefore resistor 110 may be of smaller value than that shown in the embodiment of Fig. 1.

The blocking oscillator portion of the tube thus far describes operation in the manner similar to that described in connection with Fig. 1 of the drawing. The condenser 94 is charged negatively when current is drawn by the grid 96 and this negative charge leaks off through the resistors 101, 102, 103. The potential at the junction of resistors 101 and 103 may be made more positive by the manipulation of the slide 104 so that the blocking oscillator portion operates at a higher frequency. The adjustable resistor 103, therefore, provides a frequency control for the oscillator section of the tube 89.

In the operation of the blocking oscillator a voltage wave, which is substantially of sawtooth wave form is produced at its grid, in this instance the grid 96. This sawtooth of voltage is fed to the grid 114 by way of the movable contact 116 of the potentiometer 102. The amplitude of the sawtooth applied to grid 114 is varied in this manner so that the potentiometer 102 serves as an amplitude or size control for deflection. The previously mentioned adjustable resistor 110 selects the tube characteristic of the power tube portion of the tube 89 which includes the grid 118. The resistor 110 can, therefore, serve as a linearity control for deflection. The grid 118 is connected through the primary 121 of a deflection transformer 122 to the source of positive potential for the system as indicated at reference character 123. Deflection coils 16*a* are fed from the output winding of the transformer 122.

What is claimed is:

1. A combined blocking oscillator and output drive for a deflection coil comprising a transformer having a grid coil and a plate coil, a multielement vacuum tube, a connection from said plate coil to the anode of said tube, a grid condenser, a connection from said condenser to a grid of said tube, a connection from said condenser to said grid coil, a resistor-condenser combination connected to said plate coil, a coupling from said plate coil to another grid of said tube, an output transformer having a primary and a secondary, a connection from said primary to a third electrode of said tube, and said deflection coil being connected to said output transformer secondary.

2. A combined blocking oscillator and output drive for a deflection coil comprising a transformer having a grid coil and a plate coil, a multielement vacuum tube, a connection from said plate coil to the anode of said tube, a grid condenser, a connection from said condenser to a grid of said tube, a connection from said condenser to said grid coil, a coupling from said grid connected to said condenser to another grid of said tube, said last named coupling comprising a voltage divider, said voltage divider including a variable resistor and a potentiometer, said potentiometer providing an adjustable tap for connection to said last named grid, an output transformer having a primary and a secondary, a connection from said primary to a third electrode of said tube, and said deflection coil being connected to said output transformer secondary.

GORDON F. ROGERS.

REFERENCES CITED

The following references are of record in the file of this patent:

UNITED STATES PATENTS

| Number | Name | Date |
|---|---|---|
| 2,305,919 | Eaton | Dec. 22, 1942 |
| 2,369,631 | Zanarini | Feb. 13, 1945 |
| 2,440,895 | Cawein | May 4, 1948 |
| 2,466,537 | De Vore | Apr. 5, 1949 |
| 2,466,784 | Schade | Apr. 12, 1949 |
| 2,490,743 | Sziklai | Dec. 6, 1949 |
| 2,499,080 | Webb | Feb. 28, 1950 |